E. A. HODGE.
NUT LOCK.
APPLICATION FILED JUNE 24, 1911.
1,027,604.
Patented May 28, 1912.
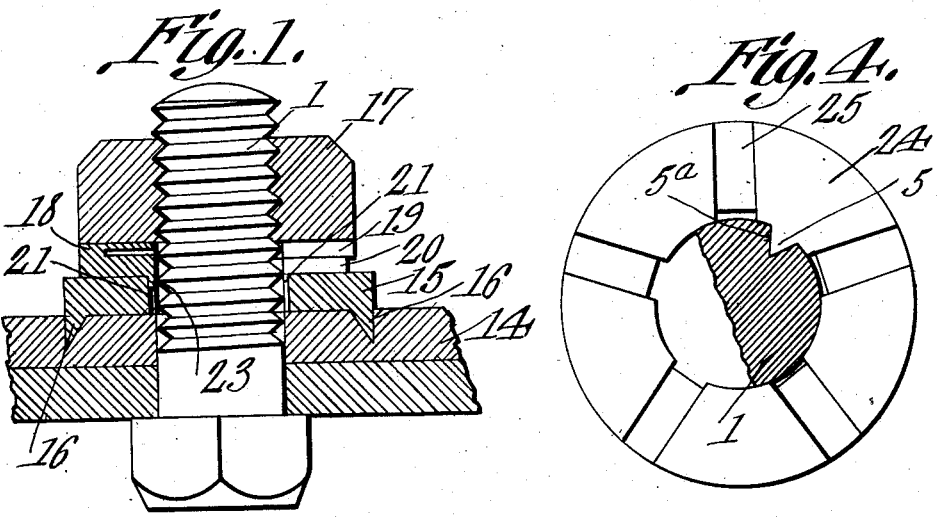
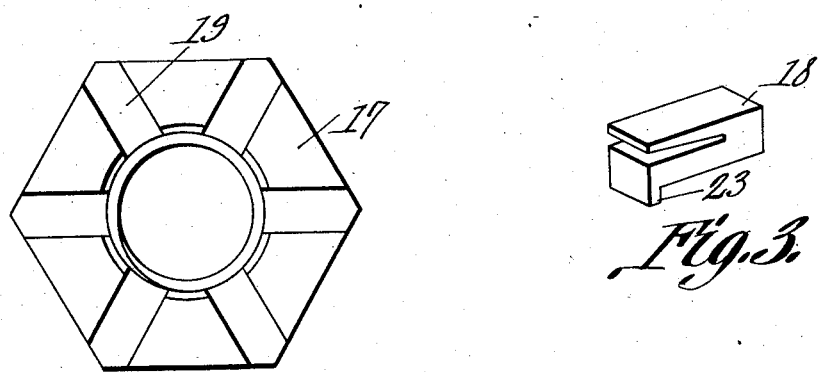
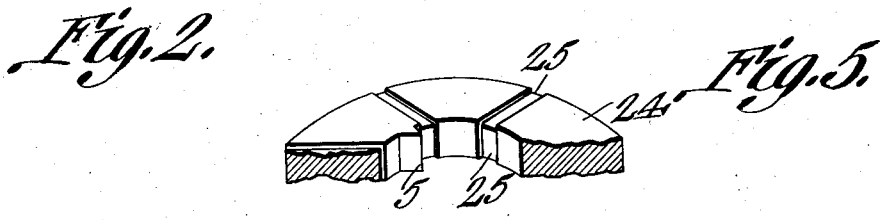
E. A. Hodge, Inventor
Witnesses
by C. A. Snow & Co., Attorneys

UNITED STATES PATENT OFFICE.

ERASTUS A. HODGE, OF SPOKANE, WASHINGTON, ASSIGNOR OF ONE-FOURTH TO FRANK W. OMAN, OF SPOKANE, WASHINGTON.

NUT-LOCK.

1,027,604.  Specification of Letters Patent.  Patented May 28, 1912.

Application filed June 24, 1911. Serial No. 635,056.

*To all whom it may concern:*

Be it known that I, ERASTUS A. HODGE, a citizen of the United States, residing at Spokane, in the county of Spokane and State of Washington, have invented a new and useful Nut-Lock, of which the following is a specification.

This invention relates to improvements in what may be termed nut-locks.

The invention has for its object to provide for securing a ready and effective locking action to guard against the casual displacement or jarring or working loose of the locking means, or the nuts and bolts.

A further object is to simplify and reduce the number of parts for securing the locking action.

A still further object is to carry out the aforesaid ends in an expeditious and effective manner.

The invention consists of certain instrumentalities and features substantially as hereinafter fully disclosed and defined by the claims.

In the accompanying drawing illustrating the preferred embodiment of my invention wherein it will be understood that various changes and modifications may be made as relates to the detailed construction and arrangement of the parts without departing from the spirit of my invention,—Figure 1 is a sectional elevation of the invention. Fig. 2 is an inverted view of the nut-member. Fig. 3 is a detached perspective view of the key. Fig. 4 is a face view of a modification of the washer. Fig. 5 is a fragmentary perspective view of the same.

In carrying out my invention, I provide a bolt 1 upon which are suitably fitted a locking washer member 15 and a nut 17 preferably angular or hexagonal in outline, and threaded, as usual, upon the bolt 1. Said nut and washer are provided in their opposed faces or surfaces with radial complemental grooves or slots 19 and 20, respectively, with their greater areas facing in a direction toward each other, the same also opening out laterally through the washer and nut, any two registering grooves or slots receiving an insertible key later described, for effecting the coupling or locking together of said nut and washer as the nut is screwed or turned to a point of proximity with said washer, as is readily appreciated.

A locking key 18, preferably of furcated or forked outline, and of resilient or springy metal to provide an automatic engaging or locking action, is provided for insertion, as above indicated, into any two of the slots or grooves 19 and 20 which may come into alinement or registration, as the nut receives a turning action, also as previously indicated. The key 18 has one of its limbs or legs, resulting from its particular contour, terminating at its outer or free end into a lateral lug 23, the purpose of which will presently appear. The grooves or slots 20 each terminate a short distance away from the walls of the washer-orifice, as at 21, thus providing a space or recess 21 at that point to receive the lateral lug or terminal 23 of the key 18. By this arrangement it will be noted that the key, received bodily by the complemental grooves or slots 19 and 20 of the washer, and nut, respectively, will be secured against longitudinal or lateral displacement, therefore effectively guarding against the turning of the nut under the conditions above indicated.

When the device is applied in connection with a wooden member, as 14, which may be a tie-bar spanning a joint and receiving bolts upon opposite sides of said joint, I provide the washer 15, with pointed teeth or projections 16 at its corner edges, to be driven into, and caused to suitably penetrate the wooden member by applying suitable pressure to the washer, for the retention of said washer in effective position against turning upon its bolt. As disclosed by Figs. 4 and 5, I may also employ a washer 24 substantially in structural contour, as relates to its key-receiving slots or grooves 25 as those of the washer 15, it being devoid, however, of anchoring teeth or points as in the latter washer, and provided with a tapering or pointed projection or tongue 5 received by a correspondingly shaped slot or groove 5ª, in that case provided in the bolt.

It is observed that the key 18 may be readily removed by suitably elongating the same so as to extend sufficiently to allow of its requisite manipulation.

It is manifest that it has been made clearly plain that my invention is extremely simple in construction and is readily applied for use, as well as adapted to be removed or displaced without mutilating or destroying the parts, while it is capable of application for various utilities.

What is claimed is:—

1. A nut-lock, including a bolt, a washer receiving said bolt, means for the retention of said washer against turning, and a resilient bifurcated key, said washer and nut having complemental radial grooves to receive said key and said key having a lateral lug adapted to engage said washer at the edge of the bolt-receiving opening.

2. A nut-lock, including a bolt having a longitudinal groove in its thread, a washer receiving said bolt and having a radial tongue engaging said groove, and a resilient bifurcated key having a lateral lug at its inner end, said lug standing at a right angle to the body portion of said key and adapted to engage said washer, said nut and washer having complemental radial grooves bodily receiving said key, said washer having the edge or wall of its bolt-receiving orifice distant from the bolt, to receive said lug.

3. A nut-lock, including a bolt having a longitudinal groove in its threaded portion, a washer having a radial tongue engaging said groove, a nut also receiving said bolt, and a resilient furcated key having a lateral lug, said washer and nut having complemental radial grooves in their opposed surfaces bodily receiving said key, the grooves of said washer terminating distantly from the bolt-receiving orifice to provide for the reception of said lateral-lug at that point.

In testimony that I claim the foregoing as my own, I have hereto affixed my signature in the presence of two witnesses.

ERASTUS A. HODGE.

Witnesses:
W. P. RUSSELL,
J. MILTON COLLINS.

Copies of this patent may be obtained for five cents each, by addressing the "Commissioner of Patents, Washington, D. C."